US012617688B2

(12) United States Patent (10) Patent No.: US 12,617,688 B2
Greulich-Weber (45) Date of Patent: May 5, 2026

(54) SILICON CARBIDE-CONTAINING MATERIAL, PRECURSOR COMPOSITION AND PREPARATION PROCESSES THEREOF

(71) Applicant: The Yellow SiC Holding GmbH, Berlin (DE)

(72) Inventor: Siegmund Greulich-Weber, Berlin (DE)

(73) Assignee: The Yellow SiC Holding GmbH, Berlin (DE)

( * ) Notice: Subject to any disclaimer, the term of this patent is extended or adjusted under 35 U.S.C. 154(b) by 0 days.

(21) Appl. No.: 18/701,641

(22) PCT Filed: Oct. 27, 2022

(86) PCT No.: PCT/EP2022/080152
§ 371 (c)(1),
(2) Date: Apr. 16, 2024

(87) PCT Pub. No.: WO2023/073145
PCT Pub. Date: May 4, 2023

(65) Prior Publication Data
US 2024/0417267 A1 Dec. 19, 2024

(30) Foreign Application Priority Data
Oct. 30, 2021 (DE) .......................... 102021128398.1

(51) Int. Cl.
*H01B 1/04* (2006.01)
*B33Y 70/00* (2020.01)
(Continued)

(52) U.S. Cl.
CPC .............. *C01B 32/97* (2017.08); *B33Y 70/00* (2014.12); *H01B 1/04* (2013.01); *H01M 4/587* (2013.01);
(Continued)

(58) Field of Classification Search
CPC . H01B 1/00; H01B 1/04; C01B 32/97; H01M 4/0471
See application file for complete search history.

(56) References Cited

U.S. PATENT DOCUMENTS 9,399,583 B2 * 7/2016 Kim ........................ C01B 32/97

FOREIGN PATENT DOCUMENTS

CN 106784732 B * 9/2019 ............ H01M 4/366
CN 112028075 A 12/2020
(Continued)

OTHER PUBLICATIONS

Form PCT/ISA/237 (mailed Feb. 20, 2023) English language translation.*
(Continued)

*Primary Examiner* — Mark Kopec
(74) *Attorney, Agent, or Firm* — David L. Nocilly; Bond Schoeneck & King PLLC

(57) ABSTRACT
Disclosed is a method for manufacturing a precursor composition of a silicon carbide-containing material, wherein nanoscale silicon dioxide, in particular fumed silica, and nanoscale carbon, in particular carbon black, are mixed. Also disclosed are a precursor composition manufactured in this way, a method for manufacturing a silicon carbide-containing material from the precursor composition and a silicon carbide-containing material manufactured in this way.

11 Claims, 1 Drawing Sheet

(51) Int. Cl.
   *C01B 32/97*       (2017.01)
   *H01M 4/587*      (2010.01)

(52) U.S. Cl.
   CPC ...... *C01P 2002/52* (2013.01); *C01P 2004/64*
                (2013.01); *C01P 2006/40* (2013.01)

(56)          References Cited

FOREIGN PATENT DOCUMENTS

| | | | | |
|---|---|---|---|---|
| CN | 111193021 A | * | 5/2022 | ............ H01M 4/362 |
| DE | 69019339 T2 | | 6/1995 | |
| DE | 102017110362 A1 | | 11/2018 | |
| JP | 6210598 B2 | | 9/2017 | |
| WO | 2016156384 A1 | | 10/2016 | |

OTHER PUBLICATIONS

Koc et al "Synthesis of beta silicon carbide powders using carbon coated fumed silica", Journal of Materials Science 33 (1998) 2537-2549.*

Vital et al "One-Step Flame Synthesis of Ultrafine SiO2—C Nanocomposite Particles with High Carbon Loading and Their Carbothermal Conversion", Ind. Eng. Chem. Res. 2007, 46, 4273-4281 4273.*

Translated German Search Report, Application No. 10 2021 128 398.1, dated Jun. 20, 2022, pp. 1-18.

* cited by examiner

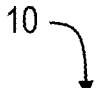
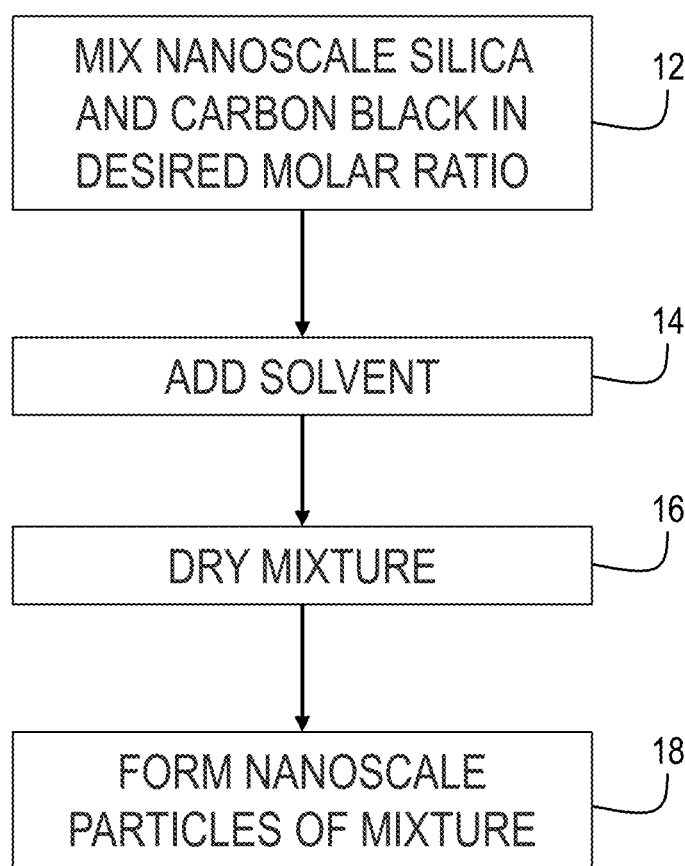

SILICON CARBIDE-CONTAINING MATERIAL, PRECURSOR COMPOSITION AND PREPARATION PROCESSES THEREOF

BACKGROUND OF THE INVENTION

Field of the Invention

The invention relates to silicon carbide-containing materials and their manufacturing, including precursor compositions for use in such manufacturing methods and methods of manufacturing such precursor compositions.

Description of the Related Art

In the well-known Degussa process, SiC is produced from a dry mixture of $SiO_2$ and C by a carbothermal reaction. Specifically, silicon carbide is produced by carbothermal reduction from compounds containing silicon dioxide. In particular, sand, various silicas or silane hydrolysates can be used as a silicon dioxide-containing compound. Sugar or organic binder systems such as phenol resins are often used as a carbon-containing material for the carbothermal reduction. Typically, the silicon dioxide and the carbon-containing material are heated to temperatures of over 1,400° C. for this purpose. What is produced by use of particulate silicon dioxide is usually a silicon carbide layer or silicon carbide granulate.

However, the Degussa process is not sufficiently effective in practice. The $SiO_2$—C mixture used is loose and only allows the carbothermal reaction to SiC to proceed incompletely because the reactants are too far apart from each other. The reaction produces large quantities of CO and $CO_2$, and the SiC produced contains remnants of excess Si. This is unsatisfactory in terms of quality, economy and ecology.

Also known is the manufacturing of structures containing silicon carbide by use of additive manufacturing. For example, structures containing silicon carbide can be produced from precursors containing carbon and silicon by use of a powder bed process with laser-induced so-called selective synthetic crystallization. Selective synthetic crystallization is disclosed, for example, in DE 10 2017 110 362 A1 and DE 10 2015 105 085 A1. In this process, precursor granules based on silane hydrolysates and sugars and possibly other additives are used in the powder bed, which are selectively converted by laser beams into silicon carbides or silicon carbide alloys. The precursor granules are produced in a sol-gel process, for example by mixing a silicate, a sugar solution, alcohol and other additives to form a sol, and gelling it at around 70° C., followed by drying at around 200° C. and pyrolysis at around 1000° C.

Electrodes, in particular anodes for lithium-ion batteries, can be made from nano- or microcrystalline or amorphous SiC. In order to improve battery efficiency, the aim is an increase of the surface area and a more efficient incorporation of lithium into the electrode material, for example by use of nano- or microstructured SiC. One example is nanostructured silicon carbide foams made of interconnected silicon carbide fibers that form an open-cell foam. Depending on the reaction conditions, in particular the temperature regime in a reactor, either isolated silicon carbide fibers or nano structured silicon carbide-containing foams can be obtained from suitable precursor materials. A method for the manufacturing of such electrode materials from a precursor granulate containing silane hydrolysates and sugar is disclosed in DE 10 2014 116 868 A1. The publication of German patent application DE 10 2017 114 243 A1 discloses a corresponding method for the manufacture of fibers and foams containing silicon carbide from liquid or gaseous precursors.

However, the use of precursors that contain sugar as a carbon source has disadvantages. Although the use of sugar, in particular liquid sugar solutions, in the production of precursor granulates achieves good and intimate mixing with the silicon-containing starting material, the sugar then tends to release large quantities of gases during the decomposition reactions in the carbothermal reduction process due to its high hydrogen and oxygen content. Most of these gases are climate-damaging gases such as $CO_2$ and methane. Associated therewith is also a certain waste of resources. The release of the gases also hinders additive manufacturing, which relies on the site-selective formation and deposition of the silicon carbide, which is made more difficult by the strong gas formation.

In the neighbouring field of silicon nitride production, US 2020/0038955 A1 discloses a method in which silicon dioxide in the form of sand, in a nitrogen atmosphere and in the presence of a small amount of graphite in a powder bed, is converted by laser irradiation to silicon nitride and carbon monoxide.

BRIEF SUMMARY OF THE INVENTION

In view of the aforementioned prior art, it is an object of the invention to provide a silicon carbide-containing material and a manufacturing method therefor, as well as a precursor composition for use in such a manufacturing method, and a method for manufacturing the precursor composition, which are more efficient and allow more precise control of the properties of the silicon carbide-containing material produced.

The solution to this object is achieved with the silicon carbide-containing materials, the methods and the precursor compositions specified in the accompanying claims.

The invention is based on the finding that nanoscale silicon dioxide and nanoscale carbon, in particular highly porous fumed silica (more precisely: fumed silicon dioxide) and carbon black particles can be mixed in wide ranges in the method according to the invention, and that these mixtures are suitable as efficient precursor compositions or precursors for the manufacture of silicon carbide. Specifically the use of conductive carbon blacks avoids the electrostatic charging of the silica particles, which otherwise makes it difficult to use these materials in such solid mixtures.

The particularly dense attachment of carbon to the nanoscale fumed silica enables optimum carbothermal reduction of $SiO_2$. In this way, high-quality SiC can be generated in a resource- and environmentally friendly manner. The conventional generation of CO and $CO_2$ due to the lack of spatial proximity of $SiO_2$ and C as well as the harmful generation of other gases from the decomposition of sugar, for example, are prevented. The use of raw materials and energy is more efficient, fewer harmful greenhouse gases are generated, and the SiC produced is of higher quality since it contains fewer impurities and its structure is easier to control.

BRIEF DESCRIPTION OF THE SEVERAL VIEWS OF THE DRAWING(S)

The present invention will be more fully understood and appreciated by reading the following Detailed Description in conjunction with the accompanying drawings, in which:

FIG. 1 is a flowchart of a method according to the present invention.

DETAILED DESCRIPTION OF THE INVENTION

Preferred embodiments of the invention are described below. The embodiments include methods of manufacturing a precursor composition as a precursor for the manufacture of a silicon carbide-containing material, precursor compositions as such so manufactured, methods of manufacturing silicon carbide-containing materials by use of said precursor compositions, and silicon carbide-containing materials manufactured thereby.

Method for Manufacturing a Precursor Composition:

Nanoscale $SiO_2$ and nanoscale carbon in the form of powders serve as starting materials for the manufacturing of the precursor composition. $SiO_2$ and carbon are each present in particles (primary particles) of a size (the largest diameter of a respective particle) of around 5 to 100 nm.

Examples of nanoscale $SiO_2$ are fumed silicas such as those available under the trade names AEROSIL, HDK or CAB-O-SIL.

Examples of nanoscale carbon are carbon blacks, i.e. industrial carbon blacks such as furnace soot with particle sizes of up to around 100 nm. It is advantageous for the carbon black to be electrically conductive, which avoids electrostatic charging of the silica particles in the mixture and provides a relatively dense mixture. High conductivity carbon black with high powder conductivity is therefore preferred, i.e. with a specific resistance of the powder of $5 \cdot 10^{-2}$ $\Omega \cdot$cm or less, preferably $1 \cdot 10^{-2}$ $\Omega \cdot$cm or less. Carbon black is particularly economical to procure, but graphene or carbon nanotubes with the above properties can also be used.

First, the two nanoscale components $SiO_2$ and C, in this example fumed silica and carbon black, are mixed in the desired ratio. Suitable mass ratios are 2.4 to 3.1 parts C (carbon black) per one part $SiO_2$ (fumed silica). The result is a nanoscale admixture of substances, which is in contrast to the sol or gel in the prior art.

A solvent is then added to the powdery mixture. A highly volatile solvent, such as an alcohol, preferably ethanol, is preferred. The amount of the solvent is not critical as long as it is sufficient to ensure that the resulting mixture can be stirred easily and a good mixability is achieved. The practical quantity depends on the specific surface area of the $SiO_2$. With a specific surface area according to BET of the $SiO_2$ particles of typically about 200 m$^2$/g, about 2.2 to 3 parts by mass of ethanol can be added to one part by mass of $SiO_2$. The mixability serves to wash the C particles (carbon black) into the $SiO_2$ particles (fumed silica). The nanoscale of the C particles (carbon black) in particular is important for this function.

The sequence described above of first mixing the two components $SiO_2$ and C and then adding the solvent makes use of the electrostatic properties of the components and already allows good mixing in the dry phase, which is then optimized by application of the solvent. The sequence can also be changed and one of the components mixed with the solvent first and then the other component added if the solvent can be mixed well with the one component and any stabilizers required for this do not result in intolerable properties in the silicon carbide-containing material produced later.

In principle, water would also be a usable solvent. However, the degree of purity required for many applications, for example in electronics and battery production, would be more complex to achieve with water.

Any dopants or alloying materials which are to be contained in the silicon carbide-containing material subsequently to be manufactured from the precursor composition can be introduced into the precursor composition together with the solvent, if necessary.

The mixture of the two components, in this case fumed silica and carbon black, in the solvent is stirred continuously. Constant stirring ensures excellent penetration of the two components by initially macroscopically washing the carbon black into the highly porous $SiO_2$ nanostructures of the fumed silica.

In the next step, the mixture is dried, preferably under continuous stirring. Depending on the process control, the drying step leads to nano to microscale particles of the precursor composition and corresponding size scales of the SiC produced later. For example, nanoscale SiC is advantageous for battery anodes, and microscale SiC for AM (additive manufacturing). The solvent transferred to the gas phase during drying is preferably recovered by distillation or recondensation.

To form nanoscale particles of the precursor composition, which are preferred for many applications, the mixture is heated in the drying step to a temperature of up to about 100° C. or only slightly above. The corresponding process parameters in the drying step for nanoscale precursor particles or nanoscale SiC obtained from them are relatively rapid stirring and heating with a small temperature gradient over time with a low final temperature. The rapid stirring here means stirring at around 2 to 10 revolutions per minute. A low final temperature and a small temperature gradient mean that the mixture is initially stirred at around 100° C. until it appears to be dry, as practically no more solvent escapes. However, the particles then still contain residual moisture, which could later lead to clumping. This are removed by slowly increasing the temperature further, typically within about an hour, to a maximum of around 150° C. or preferably a maximum of 120° C. Higher temperatures should be avoided in order to prevent oxidation of the carbon to $CO_2$. A slight negative pressure or vacuum in the reactor in which the mixture is located is beneficial to support dehumidification and to allow presence of only as little oxygen as possible. Running the process under inert gas would also support this.

Initially faster evaporation of the solvent at higher temperatures of up to 250° C., preferably up to 200° C. with slow stirring at about 1 revolution in 3 minutes leads to microscale particles of the precursor composition. This is because the $SiO_2$ particles interlock and form larger particles. The residual moisture should also be removed from these particles in order to prevent even more extensive clumping and to thus control the particle size. For this purpose, drying is continued for around two hours after the initial evaporation of the solvent until the residual moisture has also escaped from the enlarged particles.

The mixture dried in this way is a precursor composition from which a material containing silicon carbide can be manufactured by the method steps described further below.

Pyrolysis at around 1000° C., as in the known processes, is not executed here. A significant disadvantage of pyrolysis is the loss of the nanoscale nature of the particles. Even if the $SiO_2$ particles used have nanoscale dimensions, this is not retained during pyrolysis, especially if a carbohydrate such as sugar is used as the carbon source. This is because the $SiO_2$ particles stick together during the drying process to form progressively larger particles and are hardened during pyrolysis. This is avoided in the method disclosed herein by using nanoscale carbon such as carbon black as the carbon source and/or by applying temperatures during the manufacturing of the precursor composition from the nanoscale $SiO_2$ and the nanoscale carbon which do not exceed 700° C., preferably 400° C. and further preferably 250° C. or, for the formation of nanoscale particles, 150° C.

Another advantage here is that no chemical reactions are required either for the manufacture of the precursor from the nanoscale $SiO_2$ and the nanoscale carbon or for the introduction of an alloying or doping agent into the precursor. Alloyings and dopants can thus be introduced into the mixture as pure elements or substances, as they are required in the subsequent SiC material. Preferably, the manufactured mixture therefore consists of the two components $SiO_2$ and C, the solvent and, if necessary, the alloying and doping materials.

Precursor Composition:

The precursor composition manufactured by the aforementioned method contains predominantly nanoscale (or in the specified variant with higher temperature during drying, microscale) particles (primary particles) of fumed silica with embedded carbon and, where appropriate, the added dopants and alloying agents. The nanoscale particles have particle sizes in the range from 5 to 1000 nm, typically around 20 to 200 or 1000 nm. The microscale particles have particle sizes in the range from 1 to 1000 μm, typically about 1 or 20 to 200 μm.

The particles of the present precursor composition are thus much smaller than the granules of the known precursor compositions.

In addition, the present precursor composition is much purer than known precursors that are not made from nanoscale carbon (carbon black) but from materials such as sugar or organic binder systems to function as carbon suppliers. Unavoidable impurities (residual impurities) such as impurities of metals, Al, B or N, which go beyond the deliberately added dopants or alloying agents mentioned, are present only in amounts of a few ppm each, typically 10 ppm or less, preferably 5 ppm or less.

Method for Manufacturing Silicon Carbide-Containing Materials, and Silicon Carbide-Containing Materials Thus Manufactured:

The precursor composition disclosed herein can be used in place of known precursors in known methods for the manufacture of silicon carbide-containing materials.

In these methods, the precursor composition is heated to temperatures of around 1400° C. to 2000° C., preferably 1700° C. to 1900° C., and reacts to form SiC. Predominantly solid-state diffusion may take place, in which C diffuses to $SiO_2$, where SiC is formed in the carbothermal reaction. The SiC can also be formed in a gas phase and, depending on the process, can be deposited in situ or after some transportation from the gas phase.

For example, the present precursor composition is advantageously used instead of the precursor granules in additive manufacturing, for example in the powder bed process with laser-induced selective synthetic crystallization according to, for example, DE 10 2017 110 362 A1 and DE 10 2015 105 085 A1. Due to the nanoscale structure and the close proximity of the silicon and carbon in the present precursor composition, the gas development under exposure to the laser beam is lower and the effect of the laser beam is more sharply limited to the beam's irradiation position than when a precursor in the form of granules is used. This means that more precise structures of consistently high quality can be produced.

The present precursor composition is also advantageously used instead of the precursor granulate in the manufacturing of an electrode material for a battery electrode in a controlled heated reactor according to DE 10 2014 116 868 A1, for example. Electrodes, in particular anodes for lithium or sodium ion batteries, are manufactured in this way. Depending on the reaction conditions, in particular the temperature regime, nano or micro crystalline silicon carbide, isolated silicon carbide fibers or nanostructured silicon carbide-containing foams can be obtained. A particularly preferred method is the manufacturing of nanostructured silicon carbide foams as anode materials of silicon carbide, by gas phase deposition from the precursor compositions of powdery mixtures of silicon dioxide and carbon black particles.

Due in particular to the nanoscale structure and the close proximity of the silicon and carbon in the present precursor composition, the silicon carbide materials and products obtained in this way are more homogeneous and of a more uniform structure and higher quality than those produced with the known precursor. In addition, they are also particularly pure due to the greater purity of the precursor composition. The residual impurities in addition to the dopants or alloying elements, such as impurities of metals, Al, B or N, are each contained in the material only in quantities of a few ppm, typically 10 ppm or less, preferably 5 ppm or less. In this way, for example, β-SiC of high purity can be manufactured.

This opens up extended areas of application, and the silicon carbide-containing material produced can be used as a high-purity starting material for ingot or wafer production, where it can also be p-doped, or as a battery anode material or as a coating of workpieces with SiC. The precursor compositions and silicon carbide-containing materials and products having the properties disclosed herein are also advantageous independent from the disclosed manufacturing method.

The methods disclosed herein are readily applicable on an industrial scale.

The invention claimed is:

1. A method of manufacturing a precursor composition for the manufacture of a silicon carbide-containing material, comprising:
   first mixing nanoscale silicon dioxide and nanoscale carbon to form a mixture having a desired mass ratio;
   subsequently adding a solvent to the mixture and mixing the mixture; and
   drying the mixture,
   wherein the desired mass ratio of carbon to silica is in the range from 2.4:1 to 3.1:1.

2. The method of claim 1, wherein the carbon in the nanoscale carbon is present in particles of a size of 5 to 100 nm.

3. The method of claim 1, wherein the nanoscale carbon is carbon black.

4. The method of claim 1, wherein the nanoscale carbon has a specific resistance of $5 \cdot 10^{-2}$ Ω·cm or less.

5. The method of claim 1, wherein a dopant or alloying material is added to the mixture.

6. The method of claim 1, wherein
   a solvent is further added to the mixture of nanoscale silicon dioxide and nanoscale carbon, and
   the mixture is dried at a temperature of no more than 700° C.

7. The method of claim 6, wherein the drying is carried out at a temperature of not more than 150° C. and a dried nanoscale precursor composition is obtained.

8. The method of claim 6, wherein the drying is carried out at a temperature of not more than 250° C. and a dried microscale precursor composition is obtained.

9. A method of manufacturing a silicon carbide-containing material, wherein a precursor composition manufactured according to claim 1 is converted into the silicon carbide-containing material by heating.

10. The method of claim 9, wherein the conversion of the precursor composition into the silicon carbide-containing material is carried out in an additive manufacturing process with laser-induced selective synthetic crystallization.

11. The method of claim 9, wherein the silicon carbide-containing material is an electrode material of a battery electrode.

* * * * *